3,215,648
COMPOSITION COMPRISING A FILLED BLEND OF A POLYEPOXYSILICONE AND A PHENOL ALDEHYDE RESIN; AND PROCESS OF FORMING SAME
James V. Duffy, Annandale, Va., and Natcho Vasileff, deceased, late of Alexandria, Va., by Gladys C. Vasileff, executrix, Alexandria, Va., assignors to Atlantic Research Corporation, Fairfax County, Va., a corporation of Virginia
No Drawing. Filed Aug. 27, 1962, Ser. No. 219,755
26 Claims. (Cl. 260—2.5)

This invention relates to new and improved synthetic polymers and their use as coating, molding, insulating and adhesive compositions. It further relates to new and improved foamed polymers. Still further, it relates to the use of new and improved synthetic polymers as binders for fillers in the aforementioned compositions. More specifically, it relates to phenol-aldehyde prepolymeric or intermediate condensates copolymerized with polyepoxyorganosilicon compounds.

Phenolic polymers, while possessing many valuable properties such as good heat resistance, dimensional stability and hardness, and finding extensive commercial use, nevertheless are not satisfactory for many applications because of their inherent brittleness. This is particularly a problem where the polymer composition, alone or with other appropriate constituents, such as heat resistant fillers, etc., is employed in certain types of thermal insulation. The polymer must not only remain infusible and tough at high temperatures, but must also elongate or flex, without fracturing, in unison with the material which it is insulating.

An object of this invention is to provide new polymer systems comprising phenol-aldehyde condensates copolymerized with polyepoxyorganosilicon compounds.

Another object is to provide such polymer systems in the form of foams or cellular structures.

Another object is to provide such polymer systems which can be used with various fillers in coating, molding, insulating and adhesive compositions.

A further object is to provide such polymer systems which possess to a superior degree the advantageous properties of phenol-aldehyde polymers and which, in addition, are strong, flexible, heat resistant and exhibit excellent electrical properties.

Another object is to provide such polymer systems which are particularly advantageous for use in heat insulation under dynamic conditions at high temperatures and high pressures.

Other objects and advantages will become obvious from the following detailed description.

It has been discovered that a phenol-aldehyde condensate or mixtures of such condensates can be reacted with a polyepoxyorganosilicon compound to form a strong, flexible copolymer having highly superior heat insulation properties.

The phenol-aldehydes used to react with the polyepoxyorganosilicon compounds according to this invention are soluble reactive condensates obtained by the reaction of phenols and aldehydes to form products containing reactive hydroxyl groups. In the reaction of phenols and aldehydes, a variety of intermediate condensation products are formed depending upon the relative proportions of the reactants and conditions of the reaction. The reaction products can be the phenol alcohol type having terminal alkanol groups and therefore both phenolic and alcoholic hydroxyl groups or the di(hydroxyphenyl) methane type containing only phenolic hydroxyl groups. The condensation of the phenols and aldehydes can be carried out in any well known manner, as with the use of either acid or basic condensing agents and in some cases by first combining the aldehyde with a base such as ammonia to form hexamethylenetetramine and reacting it with the phenol to form the phenol-aldehyde condensate.

In general the phenol-aldehyde condensates should be used in an initial stage of reaction, such as dimethylol phenol or in an intermediate stage of reaction, such as di-(methylolhydroxyphenyl) methane. Further condensed intermediate state phenol-aldehyde prepolymers can be used so long as their condensation has not been carried so far that they have become insoluble and non-reactive. Such intermediate stage phenol-aldehyde reaction products are often termed "Stage A" condensates. At least two alcoholic hydroxyl groups, which can be attached to aliphatic groups in the same or different aromatic nuclei, are present in each condensate. Any phenol-aldehyde condensate or mixtures of condensates having the aforementioned physical and chemical properties can be reacted with the polyepoxy-organosilicon compound.

The phenol-aldehyde condensates of this invention can be derived from any mononuclear or polynuclear, monohydric or polyhydric phenol. The phenol-aldehyde condensate can be a water soluble type, an alcohol soluble type or an oil soluble type.

The phenol component of the aforedescribed condensate can be unsubstituted or mono-, di-, or tri-substituted, preferably at most di-substituted, with groups selected from the class consisting of hydroxyl; halogen, e.g., Cl and Br; alkyl, e.g., methyl, propyl, butyl, hexyl, octyl, nonyl, decyl, dodecyl; alkenyl, e.g., propenyl, butenyl, decenyl; cycloalkyl, e.g., cyclopentyl, cyclohexyl; aryl, e.g., phenyl, naphthyl; carboxy, carboxy alkyl, and carboxy alkenyl in acid form or esterified with an alkyl, alkenyl or phenyl group; alkoxy, e.g., methoxy, butoxy, octoxy; alkenyloxy, e.g., allyloxy; phenoxy.

Examples of suitable substituted phenols include; resorcinol, hydroquinone, pyrocatechol, phloroglucinol, o- and p-chlorophenol, 2,5-dichlorophenol, 4-chloro-3-methylphenol, 4-chloro-3,5-dimethylphenyl, o-, m-, and p-cresol, p-butyl phenol, p-tert-amyl phenol, p-nonyl phenol, 6-tert-butyl-m-cresol, 5-ethyl-m-cresol, thymol, carvacol, 3,4-dimethyl phenol, 3-hydroxy-5-methyl phenol, p-allyl phenol, isoeugenol, o- and p-phenylphenol, p-hydroxy benzoic acid, 5-hydroxyisophthalic acid, 2-hydroxy-3-methylbenzoic acid, methyl and ethyl p-hydroxy-benzoate, methyl, ethyl, isoamyl and phenyl salicylate, o-hydroxy cinnamic acid; ethyl o-hydroxycinnamic acid, p-hydroxyphenylacetic acid, butyl p-hydroxyphenylacetate, o- and p-methoxy phenol, o- and p-phenoxyphenol.

The condensing component can be any aldehyde which will condense with the particular phenol being used, including formaldehyde, acetaldehyde, propionaldehyde, butraldehyde, heptaldehyde, benzaldehyde, nuclear alkyl-substituted benzaldehydes, such as toluic aldehyde, etc., naphthaldehyde, etc., furfuraldehyde, glyoxal, acrolein, etc., or compounds capable of engendering aldehydes such as paraformaldehyde, hexamethylenetetramine, etc.

In general the preferred phenols are unsubstituted or monoalkyl parasubstituted phenols and the preferred aldehydes are formaldehyde and its alkyl homologues, for example, acetaldehyde and propionaldehyde.

The polyepoxyorganosilicon compounds which are reacted with the phenolaldehyde condensates to produce the new polymers of this invention are obtained by the reaction of an organic silicon containing compound and epoxy or epoxy forming compound. The reaction product can be any organosilicon compound which contains two or more reactive epoxy groups and which is free of functional groups that interfere with the desired reaction of the epoxy groups with the alcoholic hydroxyl groups of the phenol-aldehyde condensate. Preferably it contains no functional groups other than epoxy or epoxy and hydroxyl. The preferred epoxy grouping is the oxiran or 1,2-epoxy

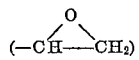

configuration.

The polyepoxyorganosilicons are monomeric or prepolymeric compounds which are reactive with the phenol-aldehyde condensates. Typical polyepoxyorganosilicon compounds which can be used in this invention are the polyepoxyorganosiloxanes. These compounds, when linear, have the general formula:

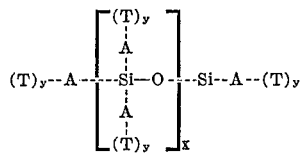

where T is

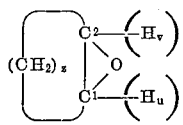

A is any organic moiety, including but not limited to additional siloxane linkages and epoxy groups, which has no functional groups which interfere with the reaction of the epoxy groups and the alcoholic hydroxyl groups of the phenol-aldehyde condensate; $x$ is a positive integer from 1 to 6; $y$ is either 0 or 1 with the proviso that at least each of two $y$'s is 1; $z$ is either 0 or a positive integer from 3 to 5; $u$ is either 0 or 1 with the proviso that when $z$ is 0, A is attached to $C^1$ and $u$ is 1 and when $z$ is a positive integer from 3 to 5 and A it attached to $C^1$, $u$ is 0; and $v$ is either 1 or 2, with the proviso that when $z$ is 0, $v$ is 2; and, when cyclic, have the general formula:

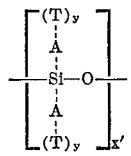

where A, T, $y$, $z$, $u$ and $v$ have the same limitations as above and $x$ is a positive integer from 3 to 8.

In general the preferred polyepoxyorganosiloxanes when linear, have the formula,

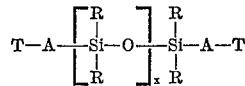

where R is any hydrocarbon group such as alkyl, e.g., methyl, isopropyl, butyl, octyl, dodecyl; aryl, e.g., phenyl, naphthyl, phenanthryl, anthryl; aralkyl, e.g., benzyl phenethyl; alkaryl, e.g., tolyl, xylyl, ethylphenyl; cycloalkyl, e.g., cyclobutyl, cyclopentyl, cyclohexyl; A is any organic moiety, preferably a hydrocarbon chain, saturated or unsaturated, aliphatic or cyclic, which can also contain hetero linkages such as O, S or N; $x$ is a positive integer from 1 to 6 and T, $u$, $v$ and $z$ have the same limitations as above; and, when cyclic, have the formula:

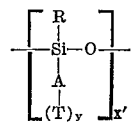

where R, T, $u$, $v$, $y$ and $z$ have the same limitations as above; A is any organic moiety, preferably a hydrocarbon chain, saturated or unsaturated, aliphatic or cyclic, which can also contain heterto linkages such as O, S or N; and $x'$ is a positive integer from 3 to 8.

Other polyepoxyorganosilicon compounds which may be used within the scope of this invention are the polyepoxyorganosilanes. These compounds have the general formula:

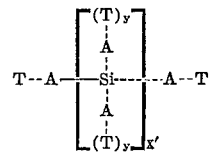

where A, T, $u$, $v$, $y$ and $z$ have the same limitations as above and $x'$ is a positive integer from 1 to 6.

The preferred polyepoxyorganosilanes have the formula:

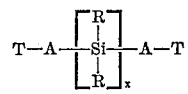

where R, T, $u$, $v$ and $z$ have the same limitations as above, A is any organic moiety, preferably a hydrocarbon chain, saturated or unsaturated, aliphatic or cyclic, which can also contain hetero linkages such as O, S or N, and $x$ is a positive integer from 1 to 6.

The polyepoxyorganosilicon compounds of this invention may be prepared in any well known manner such as (1) the addition of $\equiv$SiH$_2$ compounds across the double bond of unsaturated epoxy compounds and (2) the epoxidation of unsaturated organosilicon compounds. Illustrative of method one is the addition of allyl-2,3-epoxypropyl ether to 1,1,3,3-tetramethyldisiloxane to obtain 1,3-bis[3(2,3-epoxy propoxy) propyl]-tetramethyl disiloxane. An excess of the epoxide is warmed with 10 to 200 parts per million platinum catalyst (added as H$_2$PtCl$_6$·H$_2$O in t-butyl alcohol) to 120–140° C. with or without toluene solvent while gradually adding the siloxane. After the initial warming the addition reaction is sufficiently exothermic to maintain the reaction temperature without external heating. The reaction can be controlled conveniently by adding the siloxane to the epoxide and platinum in refluxing toluene. Following completion of the reaction excess allyl-2,3-epoxy propyl ether is removed by stripping to 150° C. at 1 mm. of mercury. The residue is filtered to give the finished polyepoxyorganosiloxane. This method can also be used to prepare compounds such as 1,3,5,7,9-pentakis [3(2,3-epoxypropoxy)propyl]-pentamethylcyclopentasiloxane,

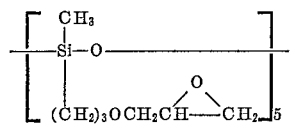

a cyclic polyepoxyorganosiloxane pentamer, as well as silane derivatives such as di[3(2,3-epoxypropoxy)propyl]-phenylmethyl silane.

Illustrative of method two is the addition of diallyldimethylsilane and peracetic acid to obtain bis-(epoxypropyl)-dimethyl silane. In a specific preparation, 70 grams (0.5 mole) of (CH$_2$=CHCH$_2$)$_2$ Si (CH$_3$)$_2$ in 100 ml. of benzene are stirred at 10° C. while dropping in 190 g. of commercial 40% peracetic acid containing 8 g. of sodium acetate. After an exothermic reaction during addition, the product is warmed to 20–30° C. for 1 hour. The product is washed three times with water and distilled at 60° C. (1 mm. of Hg). 32 grams of oily residue remained.

In addition to the aforementioned specific polyepoxyorganosilicon compounds, many others can be used within the scope of this invention. They can be cyclic, branched or linear compounds or combinations of these. Illustrations of the various types of compounds are the following:

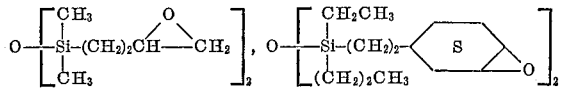

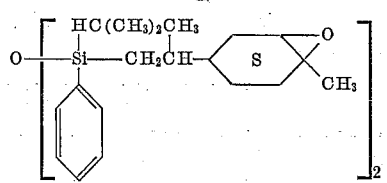

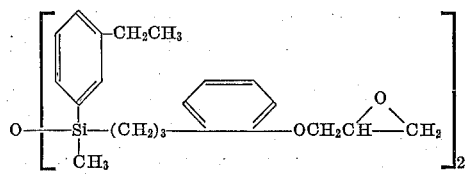

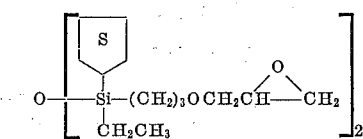

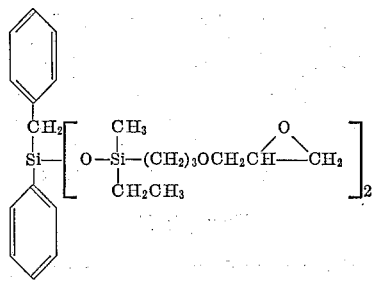

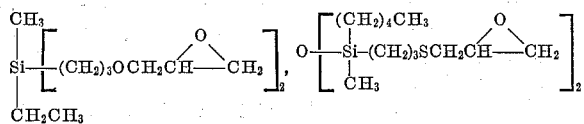

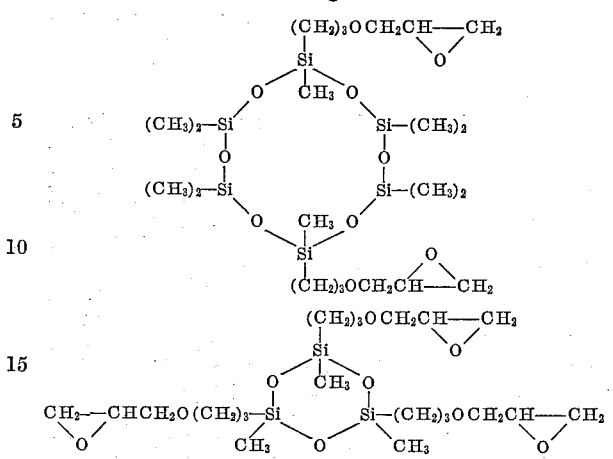

The most preferred compounds are the polyepoxyorganosiloxanes which have attached to the silicon atoms only saturated aliphatic hydrocarbon groups of 1–6 carbon atoms or cyclic hydrocarbon groups, either saturated or unsaturated, having six carbon atoms in the ring in addition to the hydrocarbon chains, including hetero linkages, which connect the silicon atom with the epoxy groups.

The phenol-aldehyde and polyepoxyorganosilicon components of this invention can be reacted in a wide range of proportions under varying operative conditions. The ratio of the number of epoxy groups of the polyepoxyorganosilicon compound to the number of the alcoholic hydroxyl groups of the phenol-aldehyde condensate can vary over a wide range. Thus this ratio can vary from about 1 to 4 to about 5 to 1, more preferably from about 1 to 2 to about 3 to 1.

In addition to the reactants there can be present in the compositions described herein various liquid solvents and co-solvents, fillers, foaming agents, stabilizers, catalysts such as monoethanolamine, pigments, dyes, etc.

The method of producing this reaction product can be accomplished in any convenient manner as illustrated by the following typical equation:

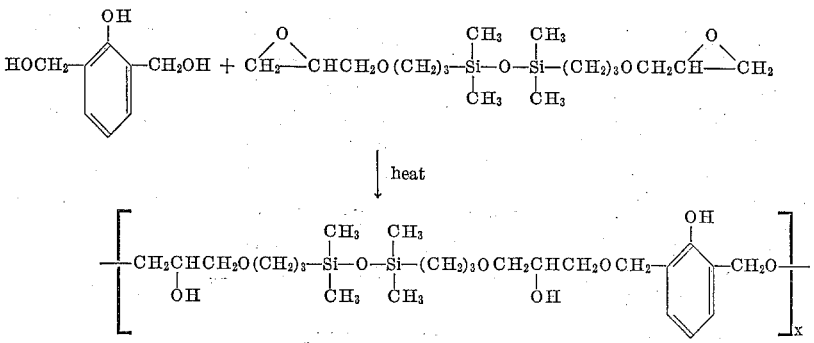

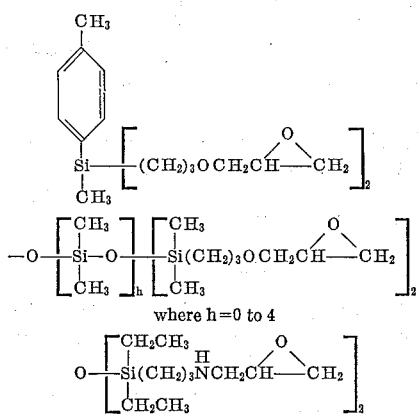

The liquid polyepoxyorganosilicon reactant can be used as the solvent or vehicle for the phenol-aldehyde condensate since this negates the problem of removing any extraneous liquids, as by volatilization, from the final polymer product. However, an added solvent medium can also be used as a reaction vehicle. Such liquid vehicles are preferably volatile and include for example, benzene, methanol, toluene, acetone, etc. Thus the phenol-aldehyde condensate can be dissolved in a solvent such as a benzene-methanol mixture or acetone and this solution mixed with the polyepoxyorganosilicon reactant. The solvent can be volatilized before or during the reaction and can be recovered in any convenient manner. It is to be understood that the process used in forming these reaction products is not limited to any particular method but can be varied in any desirable manner. Other ingredients such as fillers, etc., can be added to the reactants or solutions of the reactants during or after their mixing or, if more convenient, the additional ingredients can first be added to either reactant before mixture with the other.

Following mixture of the reactive components, the resulting composition is heated sufficiently to effect reaction between the alcoholic hydroxyl groups of the phenol-aldehyde condensate and the terminal epoxy groups of the polyepoxyorganosilicon compound. The resulting product possesses a variety of excellent physical properties such as high tensile strength, good elongation, high heat resistance and good electrical insulating qualities. It is infusible and flexible. The reaction mixture can be manipulated in a variety of ways according to its end use. Thus it may be poured into a pressure mold, cast into open forms or coated onto various articles such as metal, wires, plates, etc. and thereafter heated to give the final form of polymeric reaction product. In situations where desirable, the addition of various fillers such as silica, the silicates, etc. give the liquid reaction mixture the proper thixotropic properties to minimize flow.

The new and improved synthetic polymer systems of this invention can be produced in the form of flexible foamed or cellular resins. These can be used as a thermal and electrical insulator, cushioning material and shielding material. A typical method used to prepare these flexible foams comprises dissolving the phenol-aldehyde condensate in a volatile solvent such as acetone and mixing this solution with the polyepoxyorganosilicon compound. After evaporation of the volatile solvent, the resulting mixture is a completely compatible and castable liquid. A foam stabilizing agent, such as silicone oils, e.g., polydimethyl-siloxane oils or modified polymethyl-disiloxane oils; ethyl cellulose, cellulose acetate butyrate, polyvinyl alcohol, polyvinyl methyl ether-maleic anhydride, casein, gum arabic or zein, is added to provide for uniform cell structure. The material is heated at a suitable temperature to initiate slow reaction between the phenol-aldehyde condensate and the polyepoxyorganosilicon compound. When the viscosity of the material is sufficiently high to insure gas entrapment, it is rapidly cooled and a suitable foaming agent, such as p,p'-oxybis(benzenesulfonyl hydrazide), α,α'azobis(isobutyronitrile), 1,1'-azobis(formamide), diazoaminobenzene, N,N'-dinitrosopentamethylenetetramine, N,N'-dimethyl-N,N'-dinitrosoterephthalamide and benzene sulfonyl-hydrazide, is added. The material is then heated again to produce foaming and complete reaction between the phenol-aldehyde condensate and the polyepoxyorgano-silicon compound.

Other methods of producing the synthetic polymer compositions of this invention will be apparent from reference to the following typical embodiments in which all parts are by weight.

PREPARATION OF "STAGE A" PHENOL-ALDEHYDE CONDENSATES

Example A.—Phenol-formaldehyde 188 parts of phenol, 226 parts of formalin and 86 parts of concentrated ammonia (29%) were introduced into a 1 liter flask. The initial exotherm raised the temperature of the mixture to 65° C. after which a heating mantle was required to reach the desired reaction temperature. The mixture was heated to 95–100° C. for a period of about one hour to complete the "Stage A" reaction. The contents of the flask were poured into a shallow metal pan and after cooling the liquid phase was decanted off. The cooled, hardened Stage A condensate was pulverized and placed in a stainless steel extraction thimble and extracted with water for four hours. The light yellow powder condensate was air dried at room temperature followed by vacuum drying at 45–50° C. for 24 hours. The yield was 75–80%.

Example B.—Nonyl phenol-formaldehyde 220 parts of nonyl phenol, 113 parts of formalin and 70 parts of concentrated ammonia were introduced into a 1 liter flask. The mixture was heated at 95–100° C. for four hours. The contents of the flask were poured into a shallow metal pan and, after cooling, the liquid phase was decanted off. The material remaining in the pan was heated eight hours at 100°. After cooling, the hardened Stage A amber condensate was then pulverized, followed by air drying and finally vacuum drying at 50° C. for six hours. The yield was 85–90%.

In the following typical embodiments of this invention a commercially available phenol-formaldehyde condensate, BKR2620 was also used.

Example I

The phenol-formaldehyde condensate of Example A was dissolved in a 50/50 benzene-methanol mixture. The solution contained 30% of the condensate. 10 parts of the solution were mixed with 3 parts of 1,3-bis[3(2,3-epoxypropoxy)propyl]-tetra-methyldisiloxane. The ratio of epoxy groups to alcoholic hydroxyl groups was about 1 to 1.5. The resulting solution was divided into two equal portions. Following volatilization of the benzene-methanol solvent one portion was heated to 80° C. for 20 hours and the other to 150° C. for four and one-half hours. Both of the final synthetic polymer products were hard and flexible.

Example II 10 parts of the phenol-formaldehyde condensate solution of Example I were mixed with 5 parts of the disiloxane of Example I. The ratio of epoxy groups to alcoholic hydroxyl groups was about 1.2 to 1. The benzene-methanol solvent was evaporated and the resulting phenol-formaldehyde disiloxane solution was poured into an aluminum dish and allowed to stand overnight. It was then heated to 80° C. for six hours and 150° C. for three hours. The polymer formed was hard and flexible.

Example III 2 parts of the phenol-formaldehyde condensate of Example A were dissolved in acetone and then mixed with 8 parts of the following liquid: 1,3,5,7,9-pentakis-[3(2,3-epoxypropoxy)propyl] - pentamethylcyclopentasiloxane,

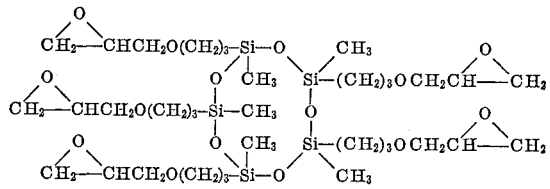

The ratio of epoxy groups to alcoholic hydroxyl groups was about 3 to 1. After volatilizing the acetone the resulting solution was heated at 150° C. for three hours. The polymer formed was hard and flexible.

Example IV

Example III was repeated using 3 parts of the phenol-formaldehyde condensate and 7 parts of the cyclic polyepoxyorganosiloxane. The ratio of epoxy to alcoholic hydroxyl groups was about 1.7 to 1. Again a hard and flexible polymer was obtained.

Example V 3 parts of the nonyl phenol-formaldehyde condensate of Example B were mixed, respectively, with each of 2, 3, 4 and 5 parts of 1,3-bis[3(2,3-epoxypropoxy)propyl]-tetramethyldisiloxane. The ratio of epoxy to alcoholic hydroxyl groups varied from about 1 to 1 to about 2.4 to 1. Each of the mixtures was dissolved in acetone. The acetone was then removed under vacuum and each of the resulting solutions was heated at 150° C. for approximately three hours. The Shore A hardness of each polymeric reaction product was, respectively, 63, 63, 53, and 45, and each was very flexible.

Example VI

Example V was repeated using 7 parts of the nonyl-phenol-formaldehyde condensate and 3 parts of the disiloxane. The ratio of epoxy groups to alcoholic hydroxyl groups was about 1 to 2. The polymeric reaction product was hard and flexible.

Example VII 3 parts of the nonyl-phenol formaldehyde condensate of Example B dissolved in acetone were mixed, respectively, with each of 3 and 5 parts of 1,3,5,7,9-pentakis-[3(2,3 - epoxypropoxy)propyl] - pentamethylcyclopentasiloxane. The ratios of epoxy to alcoholic hydroxyl groups were, respectively, about 1.5 to 1 and about 2.4 to 1. After the acetone was volatilized the first mixture was heated at 150° C. for three hours. The second was heated at 150° C. for six hours. Each of the resulting polymers was flexible.

Example VIII 5 parts of BKR2620 were dissolved in acetone and this solution was mixed with 5 parts of 1,3-bis[3(2,3-epoxypropoxy)propyl]-tetramethyldisiloxane and the resulting solution was heated at 150° C. for three hours. This method was repeated using 4 and 3 parts of BKR2620 with respectively, 6 and 7 parts of the polyepoxydisiloxane. Each run resulted in a flexible polymeric reaction product.

Example IX 4 parts of the phenol-formaldehyde condensate of Example A was dissolved in acetone. This solution was mixed with 6 parts of 1,3-bis[3(2,3-epoxypropoxy)propyl] - tetramethyldisiloxane. Following volatilization of the acetone, the addition of a minor amount, about 1–3% by weight, of a polydimethylsiloxane oil, a foam stabilizing agent, the remaining solution was heated at 150° C. for 15 minutes in order to increase the viscosity of the solution. 15 parts of a blowing agent, p,p'-oxybis (benzenesulfonyl hydrazide) were added. The composition was heated for 20 minutes at 150° C. to complete the reaction. A flexible foam of high compressive strength having a density of 10 lbs./cu. ft. was produced.

Example X

The method of Example IX was repeated using respectively 4 and 3 parts of the phenol-formaldehyde condensate, 6 and 7 parts of the polyepoxydisiloxane, 0.5 and 1 part of the foaming agent. A minor amount of foam stabilizer was added. Again each run resulted in a flexible cellular reaction product having good compressive strength.

The tensile strength and elongation of several typical formulations of this invention have been determined and are recorded in Table I.

TABLE I.—MECHANICAL PROPERTIES OF REACTION PRODUCTS

| Formulation (parts by weight) | Reaction conditions | | Mechanical properties | |
|---|---|---|---|---|
| | Temperature (° C.) | Time (hrs.) | Tensile strength (p.s.i.) | Elongation (percent) |
| Ph-Form [c]: Disiloxane:[d] | | | | |
| 1:3 | 150 | [a] 3 | 85 | 33 |
| 1:2.33 | 150 | [a] 3 | 1,040 | 270 |
| 1:1.5 | 150 | [a] 3 | 2,060 | 74 |
| 1:1 | 150 | [a] 3 | 3,290 | 17 |
| N.Ph-Form [e]: Disiloxane:[d] | | | | |
| 1:2.5 | 150 | [a] 15 | 79 | 72 |
| 1:1 | 150 | [a] 20 | 340 | 220 |
| 1:0.67 | 150 | [a] 20 | 532 | 380 |
| 1:0.54 | 150 / 150 | [a] 6.5 / [b] 6 | 475 | 220 |

[a] Flash molded at 1,000 p.s.i. gage pressure.
[b] Post cure.
[c] Phenol-formaldehyde condensate of Example A.
[d] 1,3-bis[3(2,3-epoxypropoxy)propyl]-tetramethyldisiloxane.
[e] Nonyl-phenol formaldehyde condensate of Example B.

Because of their high heat resistance and flexibility, the polymer systems of this invention are particularly useful as binders for heat resistant fillers such as silica, the silicates, e.g., asbestos, the oxalates, e.g., potassium oxalate, the carbonates, e.g., magnesium carbonate, the borates, e.g., sodium borate, etc. These filled polymer compositions are particularly advantageous for use as insulation which is subjected to extremes of temperature, pressure and elastic strain. Such insulating compositions are especially suitable to prevent excessive heating of the structural parts of a rocket motor, particularly the combustion chamber, by the propellant burning inside. The insulation, when bonded to these structural parts must be sufficiently flexible to conform to the shape of such parts which strain elastically under high operational pressures. If the insulation does not elongate adequately, it fractures, and the hot propellant gases penetrate to the motor case or other structural parts to cause overheating and failure. These filled polymer compositions can also act as grain inhibitors when they are bonded to a propellant grain. Flexibility of such compositions is essential to withstand the enormous vibrational, heat and pressure stresses which are placed upon propellant grains. Fracture of the composition under such stresses would result in motor failure by unrestricted burning, e.g., side burning, of the propellant grain.

The proportions of polymer and fillers can vary over a wide range so long as the composition remains sufficiently flexible to withstand the extreme conditions to which it is exposed. Preferably the polymer and filler are added in approximately equal parts.

Specific formulations of the filled polymer compositions of this invention were subjected to an oxyacetylene torch test and the results recorded in Table II. Standard Naval Ordnance Laboratory torch test conditions were used. The ratio of oxygen to acetylene was 1.2:1 at total flow rate of 225.0 std. cu. ft./hr. at 75° F. and atmospheric pressure. The spacing between the torch tip and specimen was ¾ inch. The parameters measured were the insulation indices at 400° F. and 600° F., $I_{400° F.}$ and $I_{600° F.}$, respectively. The insulation index is the time in seconds required for the back of a specimen to reach a predetermined temperature divided by the thickness in inches of the specimen. In an oxyacetylene torch test of this type, this is the most indicative parameter for good insulator performance.

TABLE II.—OXYACETYLENE TORCH TEST [a] RESULTS FOR ASBESTOS-FILLED POLYMER COMPOSITIONS

| Formulation [b] of polymers (percent) | Reaction conditions [c] | | $I_{400°F}$ [i] (sec./in.) | Average $I_{400°F}$ (sec./in.) | $I_{600°F}$ [i] (sec./in.) | Average $I_{600°F}$ (sec./in.) | $I_{400-600°F}$ (sec./in.) |
|---|---|---|---|---|---|---|---|
| | Pressure (p.s.i.) | Time (hrs.) | | | | | |
| Ph-Form [f]:Disiloxane: [g] | | | | | | | |
| 20:80 | 3,000 | 3 | 137.8 / 131.0 | 134.4 | 146.0 / 137.5 | 141.8 | 8.2 / 6.5 |
| 30:70 | 3,000 | 3 | 170.3 / 184.0 | 177.2 | 178.8 / 195.2 | 187.0 | 8.5 / 11.2 |
| 40:60 | 3,000 | 3 | 168.1 / 168.0 | 168.1 | 173.3 / 180.5 | 176.9 | 5.2 / 12.5 |
| 50:50 | 3,000 | 3 | 177.6 / 177.3 | 177.5 | 186.8 / 183.0 | 184.9 | 9.2 / 5.7 |
| BKR 2620:Disiloxane: [g] | | | | | | | |
| 30:70 | 3,000 | 15 | 127.2 / 136.9 | 132.1 | [d] 132.1 / [d] 146.8 | 139.5 | 4.9 / 7.5 |
| 40:60 | 3,000 | 3 | 112.8 / 126.8 | 119.8 | [d] 117.9 / [d] 137.5 | 126.3 | 5.1 / 10.7 |
| 50:50 | 3,000 | 3 | 137.2 / 139.5 | 138.4 | [d] 142.8 / [d] 150.9 | 146.9 | 5.8 / 11.4 |
| N.Ph-Form [h]:Disiloxane: [g] | | | | | | | |
| 40:60 | 1,000 | 10 | 180.1 | 180.1 | 186.5 | 186.5 | 6.4 |
| 50:50 | 3,000 | 8 | 129.1 / 147.2 | 138.2 | [d] 132.6 / [d] 152.8 | 142.7 | 5.5 / 5.6 |
| 60:40 | 3,000 | 9 | 131.2 / 134.5 | 132.9 | [d] 133.5 / [d] 137.5 | 135.4 | 2.3 / 2.7 |
| 65:35 | 3,000 | 9 | 113.2 / 114.5 | 113.9 | [d] 117.8 / [d] 123.1 | 120.5 | 4.6 / 8.6 |
| Ph-Form [f]:N.Ph-Forms [h]:Disiloxane: [g] | | | | | | | |
| 10:30:60 | 1,000 | 5 | 164.4 | 164.4 | 171.0 | 171.0 | 6.6 |
| 20:20:60 | 1,000 | 3 | 144.0 | 144.0 | [d] 150.5 | 150.5 | 6.5 |
| 30:10:60 | 1,000 | 3 | 163.2 | 163.2 | 166.9 | 166.9 | 3.7 |

[a] Naval Ordnance Laboratory Standard Conditions.
[b] All resins filled with 45 percent of asbestos.
[c] All samples were reacted at 150° C.
[d] The values for $I_{600°F}$ were determined by extrapolation of the time-temperature trace from 400° F.
[e] Post-cured for 3.5 hours at 150° C.
[f] Phenol-formaldehyde condensate of Example A.
[g] 1,3-bis [3(2,3-epoxypropoxy)propyl]-tetramethyldisiloxane.
[h] Nonyl phenol-formaldehyde of Example B.
[i] Explanation and calculation of $I_{400°F}$ and $I_{600°F}$:
$t_{400°F}$ = time for back of specimen to reach 400° F. (seconds)
$t_{600°F}$ = time for back of specimen to reach 600° F. (seconds)
Insulation Index at temperature $T = I_T = t_T / T_0$ (sec./in.)
$T_0$ = initial specimen thickness (mils or inches)

The results of oxyacetylene torch test indicate exceptionally good insulation characteristics for the filled polymer compositions tested.

A particularly preferred heat resistant filler comprises a mixture of equal amounts of asbestos and potassium oxalate. As shown by the results of a convergent section motor firing test, recorded in Table III, a polymer composition having this mixture has a lower char rate than polymer compositions containing either asbestos or potassium oxalate alone. Specimens of molded filled polymer compositions having dimensions 1¾ x 1¼ x ½ inch thick were used in the motor test. These specimens were mounted around the face of the convergent section of an end-burning motor. They were held in place by imbedding them in an epoxy-asbestos material. This allows only the front, flat surface of the specimen to be exposed to the hot combustion gases. The char rate was determined by subtracting the thickness of the virgin (uncharred) material after firing from the original thickness of the specimen, and dividing this value by the total firing time of the motor. These tests were conducted with a propellant which burned at 6500° F. for 46 seconds at high pressure. The specimens were quenched with nitrogen to prevent after burning.

In order to be a good insulator under the aforementioned extreme conditions any composition, in addition to being flexible, must have an acceptably low char rate and low rate of heat transmission. The polyepoxyorganosiloxane compounds of this invention not only impart flexibility to the polymer composition but also contribute substantially to the required low char rate and low rate of heat transmission. If the phenol-aldehyde condensates of this invention were completely polymerized by themselves, highly cross-linked, hard, inflexible materials would result. However, when the polyepoxyorganosiloxane compounds are introduced into the phenol-aldehyde condensates, the chain length between the phenolic molecules is increased and the amount of cross-linking is decreased. Both of these results impart flexibility to the polymer systems. In addition, the polyepoxyorganosiloxane moiety of the polymer system, when subjected to extremely high temperatures of the order of those produced by burning propellants, resists decomposition much more readily than the phenol-aldehyde moiety because its Si-O bonds are much stronger than the C-C bonds of the condensate. However, even as the polymer decomposes, heat refractory materials such as $SiO_2$, which result from the decomposition of the polyepoxyorganosiloxane moiety, re-

TABLE III.—CONVERGENT SECTION MOTOR FIRING OF FILLED PHENOLIC RESINS

| Formulation (percent) | Resin composition by weight (percent) | Reaction conditions, temp./pressure/time [d] | Thickness (in.) | | | | Char rate, mils/sec. |
|---|---|---|---|---|---|---|---|
| | | | Initial | Final | Char | Uncharred | |
| 55 resin / 45 asbestos | 10 standard phenolic [a] / 30 nonyl phenolic [b] / 60 disiloxane [c] | 150° C./3,000 p.s.i./3 hrs | 0.52 | 0.51 | 0.26 | 0.25 | 5.9 |
| 55 resin / 45 asbestos | 20 standard phenolic [a] / 20 nonyl phenolic [b] / 60 disiloxane [c] | 150° C./3,000 p.s.i./3 hrs | 0.50 | 0.46 | 0.26 | 0.20 | 6.5 |
| 55 resin / 45 asbestos | 30 standard phenolic [a] / 10 nonyl phenolic [b] / 60 disiloxane [c] | 150° C./3,000 p.s.i./3 hrs | 0.49 | 0.39 | 0.15 | 0.24 | 5.4 |
| 55 resin / 22.5 asbestos / 22.5 potassium oxalate | 50 standard phenolic [a] / 50 disiloxane [c] | 150° C./3,000 p.s.i./3 hrs | 0.53 | 0.56 | 0.18 | 0.38 | 3.3 |
| 55 resin / 45 potassium oxalate | 50 standard phenolic [a] / 50 disiloxane [c] | 150° C./3,000 p.s.i./3 hrs | 0.53 | 0.31 | 0.02 | 0.29 | 5.2 |

[a] Phenol-formaldehyde condensate of Example A.
[b] Nonyl phenol-formaldehyde condensate of Example B.
[c] 1,3-bis [3(2,3-epoxypropoxy)propyl]-tetramethyldisiloxane.
[d] Flash molded at 3000 p.s.i. gage pressure.

main in the char layer, which forms progressively from the exposed surface as the composition decomposes, imparting heat insulating qualities to this layer. Furthermore as the polymer decomposes, the long molecular chains of the polyepoxyorganosiloxane portion are pyrolyzed to yield low molecular weight gases. Not only are large amounts of heat energy required to form these gases, but also heat energy is absorbed during the transpirational cooling process in which these gases escape through the char layer.

As will be apparent to those skilled in the art, various other modifications can be carried out from the above disclosure without departing from the spirit and scope of the invention embodied within the claims.

We claim:

1. A composition having an average insulation index of at least about 120 sec./in. at 600° F. when filled with 45 percent of asbestos comprising the reaction product of a soluble phenol-aldehyde condensate containing reactive alcoholic hydroxyl groups and a polyepoxyorganosilicon compound free of functional groups which interfere with the reaction of the epoxy groups of the polyepoxyorganosilicon compound and said alcoholic hydroxy groups wherein said compound is selected from the group consisting of 1,3 - bis[3(2,3-epoxypropoxy)propyl] - tetramethyldisiloxane, 1,3,5,7,9 - pentakis[3(2,3-epoxypropoxy)propyl]-pentamethylcyclopentasiloxane,

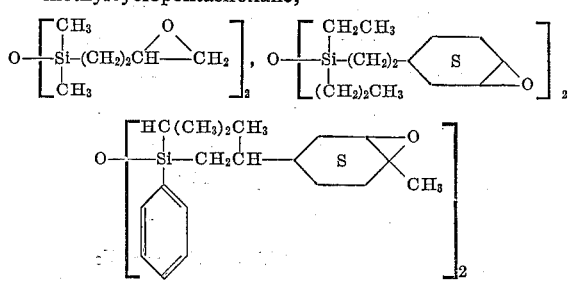

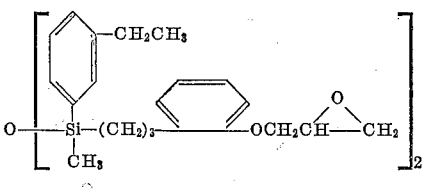

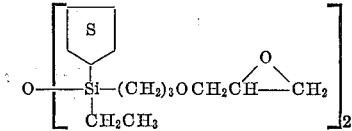

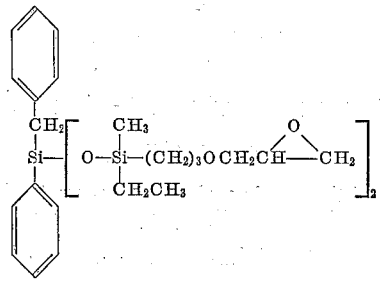

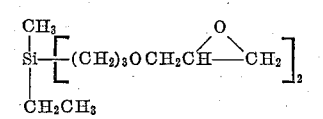

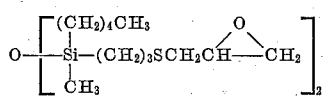

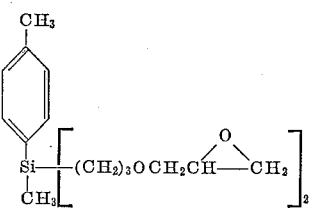

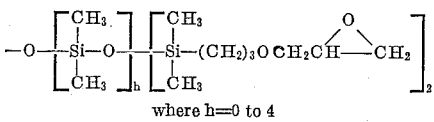

where h=0 to 4

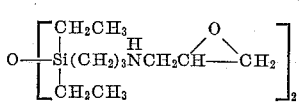

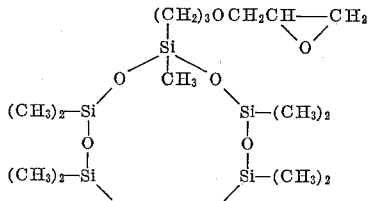

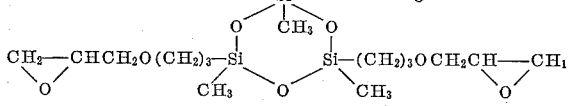

di-[3(2,3 - epoxypropoxy)propyl]-phenylmethyl silane, and bis-(epoxypropyl)-dimethyl silane, the ratio of the number of epoxy groups to the number of said reactive alcoholic epoxy groups varying from about 1:4 to about 5:1.

2. The composition according to claim 1 in which the polyepoxyorganosilicon compound is 1,3-bis[3(2,3-epoxypropoxy)propyl]-tetramethyldisiloxane.

3. The composition according to claim 1 in which the polyepoxyorganosilicon compound is 1,3,5,7,9 - pentakis [3(2,3-epoxypropoxy)propyl] - pentamethylcyclopentasiloxane.

4. The composition according to claim 1 in which the phenol component of the phenol-aldehyde condensate is selected from the group consisting of phenol, resorcinol, hydroquinone, pyrocatechol, phloroglucinol, o- and p-chlorophenol, 2,5-dichlorophenol, 4-chloro-3-methylphenol, 4-chloro-3,5-dimethylphenol, o-, m- and p-cresol, p-butyl phenol, p-tert-amyl phenol, p-nonyl phenol, 6-tert-butyl-m-cresol, 5-ethyl-m-cresol, thymol, carvacol, 3, 4-dimethyl phenol, 3-hydroxy-5-methyl phenol, p-allyl phenol, isocugenol, o- and p-phenylphenol, p-hydroxy benzoic acid, 5-hydroxyisophthalic acid, 2-hydroxy-3-methylbenzoic acid, methyl and ethyl p-hydroxy-benzoate, methyl, ethyl, isoamyl and phenyl salicylate, o-hydroxycinnamic acid, ethyl o-hydroxycinnamic acid, p-hydroxyphenylacetic acid, butyl p-hydroxyphenylacetate, o- and p-methoxy phenol, and o- and p-phenoxyphenol and the aldehyde component is selected from the group consisting of formaldehyde, acetaldehyde, propionaldehyde, butyraldehyde, heptaldehyde, benzaldehyde, toluic aldehyde, naphthaldehyde, furfuraldehyde, glyoxal, acrolein, paraformaldehyde and hexamethylenetetramine.

5. The composition according to claim 4 in which the phenol-aldehyde condensate is phenol-formaldehyde.

6. The composition according to claim 4 in which the phenol-aldehyde condensate is p-nonyl phenol-formaldehyde.

7. The composition according to claim 1 in which the reaction product is that of phenol-formaldehyde reacted with 1,3-bis[3(2,3-epoxypropoxy)propyl] - tetramethyldisiloxane.

8. The composition according to claim 1 in which the reaction product is that of p-nonyl phenol-formaldehyde reacted with 1,3-bis[3(2,3-epoxypropoxy)propyl] - tetramethyldisiloxane.

9. The composition according to claim 1 in which the reaction product is that of phenol-formaldehyde reacted with 1,3,5,7,9 - pentakis - [3(2,3 - epoxypropoxy)propyl]-pentamethylcyclopentasiloxane.

10. The composition according to claim 1 in which the reaction product is that of p-nonyl phenol-formaldehyde reacted with 1,3,5,7,9-pentakis[3(2,3-epoxypropoxy)propyl]-pentamethylcyclopentasiloxane.

11. The composition of claim 1 in the form of a cellular structure.

12. The composition of claim 1 in which there is present a heat resistant filler.

13. The composition of claim 12 in which the filler is selected from the group consisting of the silicates, oxalates, carbonates, borates and silica and mixtures thereof.

14. The composition of claim 12 in which the filler comprises equal proportions of asbestos and potassium oxalate.

15. The composition of claim 12 in which the filler consists essentially of asbestos.

16. A process for making a composition having an average insulation index of at least about 120 sec./in. at 600° F. when filled with 45 percent of asbestos which comprises reacting at an elevated temperature a soluble phenol-aldehyde condensate containing reactive alcoholic hydroxyl groups with a polyepoxyorganosilicon compound free of functional groups which interfere with the reaction of the polyepoxyorganosilicon compound said compound being selected from the group consisting of 1,3-bis[3(2,3 - epoxypropoxy)propyl] - tetramethyldisiloxane, 1,3,5,7,9-pentakis[3(2,3 - epoxypropoxy)propyl]-pentamethylcyclopentasiloxane,

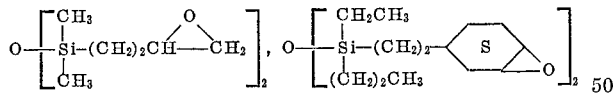

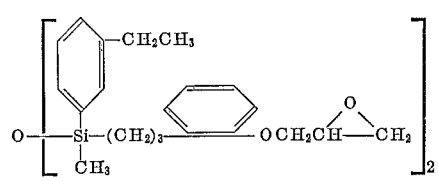

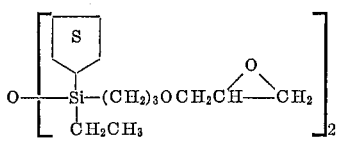

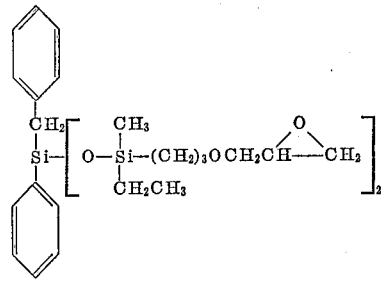

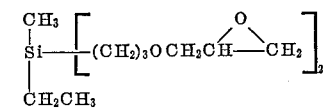

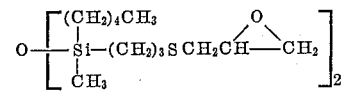

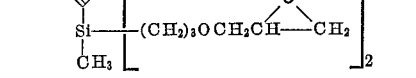

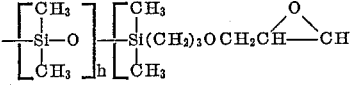

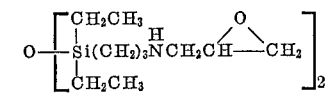

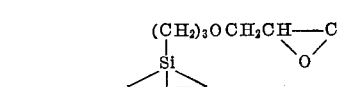

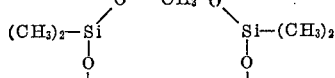

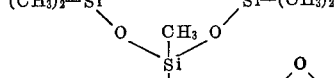

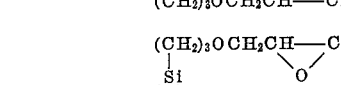

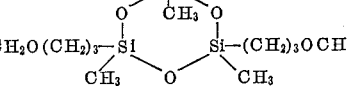

di-[3(2,3-epoxypropoxy)propyl] - phenylmethyl silane, and bis-(epoxypropyl)-dimethyl silane, the ratio of the number of epoxy groups to the number of said reactive alcoholic epoxy groups varying from about 1:4 to about 5:1.

17. The process according to claim 16 in which the phenol component of the phenol-aldehyde condensate is selected from the group consisting of phenol, resorcinol, hydroquinone, pyrocatechol, phloroglucinol, o- and p-chlorophenol, 2,5-dichlorophenol, 4-chloro-3-methylphenol, 4-chloro-3,5-dimethylphenol, o-, m- and p-cresol, p-butyl phenol, p-tert-amyl phenol, p-nonyl phenol, 6-tert-butyl-m-cresol, 5-ethyl-m-cresol, thymol, carvacol, 3,4-dimethyl phenol, 3 - hydroxy - 5 - methyl phenol, p-allyl phenol, isocugenol, o- and p-phenylphenol, p-hydroxy benzoic acid, 5-hydroxyisophthalic acid, 2-hydroxy-3-methylbenzoic acid, methyl and ethyl p-hydroxy-benzoate, methyl, ethyl, isoamyl and phenyl salicylate, o-hydroxycinnamic acid, ethyl o-hydroxycinnamic acid, p-hydroxyphenylacetic acid, butyl p-hydroxyphenylacetate, o- and p-methoxy phenol, and o- and p-phenoxyphenol and the aldehyde component is selected from the group consisting of formaldehyde, acetaldehyde, propionaldehyde, butyraldehyde, heptaldehyde, benzaldehyde, toluic aldehyde, naphthaldehyde, furfuraldehyde, glyoxal, acrolein, paraformaldehyde and hexamethylenetetramine.

18. The process according to claim 16 in which the phenol-aldehyde condensate is phenol-formaldehyde.

19. The process according to claim 16 in which the phenol-aldehyde condensate is p-nonyl phenol-formaldehyde.

20. The process according to claim 16 in which the polyepoxy - organosilicon compound is 1,3 - bis[3(2,3-epoxypropoxy)propyl]-tetramethyldisiloxane.

21. The process according to claim 16 in which the polyepoxy-organosilicon compound is 1,3,5,7,9-pentakis-[3(2,3 - epoxypropoxy)propyl] - pentamethylcyclopentasiloxane.

22. A process for making a composition having an average insulation index of at least about 120 sec./in. at 600° F. when filled with 45 percent of asbestos which comprises reacting at an elevated temperature a soluble phenol - formaldehyde condensate with 1,3 - bis[3(2,3-epoxypropoxy)propyl]-tetramethyldisiloxane.

23. A process for making a composition having an average insulation index of at least about 120 sec./in. at 600° F. when filled with 45 percent asbestos which comprises reacting at an elevated temperature a soluble phenol-formaldehyde condensate with 1,3,5,7,9-pentakis-[3(2,3 - epoxypropoxy)propyl] - pentamethylcyclopentasiloxane.

24. A process for making a composition having an average insulation index of at least about 120 sec./in. at 600° F. when filled with 45 percent asbestos which comprises reacting at an elevated temperature a soluble p-nonyl phenol-formaldehyde condensate with 1,3-bis[3(2,3-epoxypropoxy)propyl]-tetramethyldisiloxane.

25. A process for making a composition having an average insulation index of at least about 120 sec./in. at 600° F. when filled with 45 percent asbestos which comprises reacting at an elevated temperature a soluble p-nonyl phenol-formaldehyde condensate with 1,3,5,7,9-pentakis[3(2,3 - epoxypropoxy)propyl] - pentamethylcyclopentasiloxane.

26. The process according to claim 16 wherein the reaction is carried out in the presence of a foaming agent consisting essentially of p,p'-oxybis (benzenesulfonyl hydrazide).

References Cited by the Examiner
UNITED STATES PATENTS

| | | | |
|---|---|---|---|
| 2,521,911 | 9/50 | Greenlee | 260—43 |
| 2,629,698 | 2/53 | Sterling | 260—2.5 |
| 2,883,397 | 4/59 | Bailey | 260—46.5 |
| 3,062,682 | 11/62 | Morgan et al. | 260—2.5 |

OTHER REFERENCES

"New Products Information," "SYL–Keern 90," Dow Corning Corporation, Midland, Michigan, Bulletin No. Q–2–101, December 1957, pages 1–7.

MURRAY TILLMAN, *Primary Examiner*.

LEON J. BERCOVITZ, *Examiner*.

UNITED STATES PATENT OFFICE
CERTIFICATE OF CORRECTION

Patent No. 3,215,648                                   November 2, 1965

James V. Duffy et al.

It is hereby certified that error appears in the above numbered patent requiring correction and that the said Letters Patent should read as corrected below.

Column 3, line 73, for "heterto" read -- hetero --; column 4, lines 4 to 9, the formula should appear as shown below instead of as in the patent:

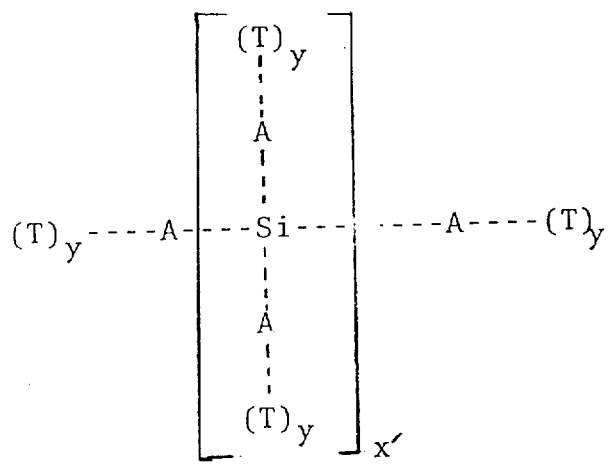

Signed and sealed this 20th day of September 1966.

(SEAL)
Attest:

ERNEST W. SWIDER                            EDWARD J. BRENNER
Attesting Officer                          Commissioner of Patents